United States Patent [19]
Snyder

[11] Patent Number: 6,166,374
[45] Date of Patent: Dec. 26, 2000

[54] MOLDED SPRING GAP SETTING MECHANISM FOR OPTICAL ENCODERS

[75] Inventor: Tanya J. Snyder, Minneapolis, Minn.

[73] Assignee: Agilent Technologies, Inc., Palo Alto, Calif.

[21] Appl. No.: 09/186,727

[22] Filed: Nov. 4, 1998

[51] Int. Cl.[7] .................................................. G01D 5/34
[52] U.S. Cl. ..................................... 250/231.13; 250/239
[58] Field of Search ........................ 250/231.13, 231.14, 250/229, 239, 233, 237 G, 231.16–231.18

[56] References Cited

U.S. PATENT DOCUMENTS

| | | | |
|---|---|---|---|
| 4,338,517 | 7/1982 | Perrine | 250/231.14 |
| 4,703,176 | 10/1987 | Hahn et al. | 250/231.14 |
| 4,712,005 | 12/1987 | Savla | 250/231.14 |
| 4,794,250 | 12/1988 | Togami | 250/231.14 |
| 5,057,684 | 10/1991 | Service | 250/231.13 |
| 5,701,525 | 12/1997 | Caterino et al. | 396/132 |

*Primary Examiner*—Que T. Le
*Assistant Examiner*—Thanh X. Luu
*Attorney, Agent, or Firm*—Pamela Lau Kee

[57] ABSTRACT

The present invention is technique for setting the codewheel gap that is quick and requires no parts beyond what is needed for encoder operation. The gapping mechanism is incorporated into the encoder cover and maintains solid contact between the base and the housing of the encoder.

10 Claims, 4 Drawing Sheets

MOLDED SPRING GAP SETTING MECHANISM FOR OPTICAL ENCODERS

FIELD OF THE INVENTION

The present invention is directed towards the field of optical encoders, particularly towards alignment assembly.

BACKGROUND

For an optical encoder to work optimally, the distance between the system's codewheel, emitter, and detector must be controlled. Current encoder packages that are intended for quick assembly use a variety of methods for setting the gap between the emitter/detector and codewheel.

One prior art method uses a shim of controlled thickness that the codewheel is pushed against during assembly. After the distance is set, the shim is removed. The assembly time required is relatively long and it is necessary to provide the user with a gapping shim that is disposed of after assembly.

A second prior art method, shown in FIGS. 1 and 2, uses a mechanical mounting feature connected to cams. During assembly, the codewheel is pushed against the mechanical feature, after which the feature is moved away from the codewheel by twisting the cam. During operation, the codewheel must be able to rotate freely so any mechanical feature used to control the gap must be removed after installation. This manufacturing method is faster than the shim method but it too can require extra cam parts that are not used during operation. The system shown in FIG. 2 can result in poor contact between the housing and a cam on the base of the encoder that will impact performance of the encoder because of emitter/detector misalignment.

SUMMARY OF THE INVENTION

The present invention is technique for setting the codewheel gap that is quick and requires no parts beyond what is needed for encoder operation. The gapping mechanism is incorporated into the housing or encoder cover and maintains solid contact between the base and the housing of the encoder.

The encoder cover includes a gap setting mechanism positioned centrally. The gap setting mechanism includes a centerpiece having springs distributed along the perimeter that connect it to the encoder cover. The centerpiece further includes at least one projection the length of the desired gapping distance. In a preferred embodiment, the centerpiece is a triangle having a cantilever spring positioned at each vertex. The desired gapping distance corresponds to the length of three pins.

DETAILED DESCRIPTION OF THE DRAWINGS

Figure 1:
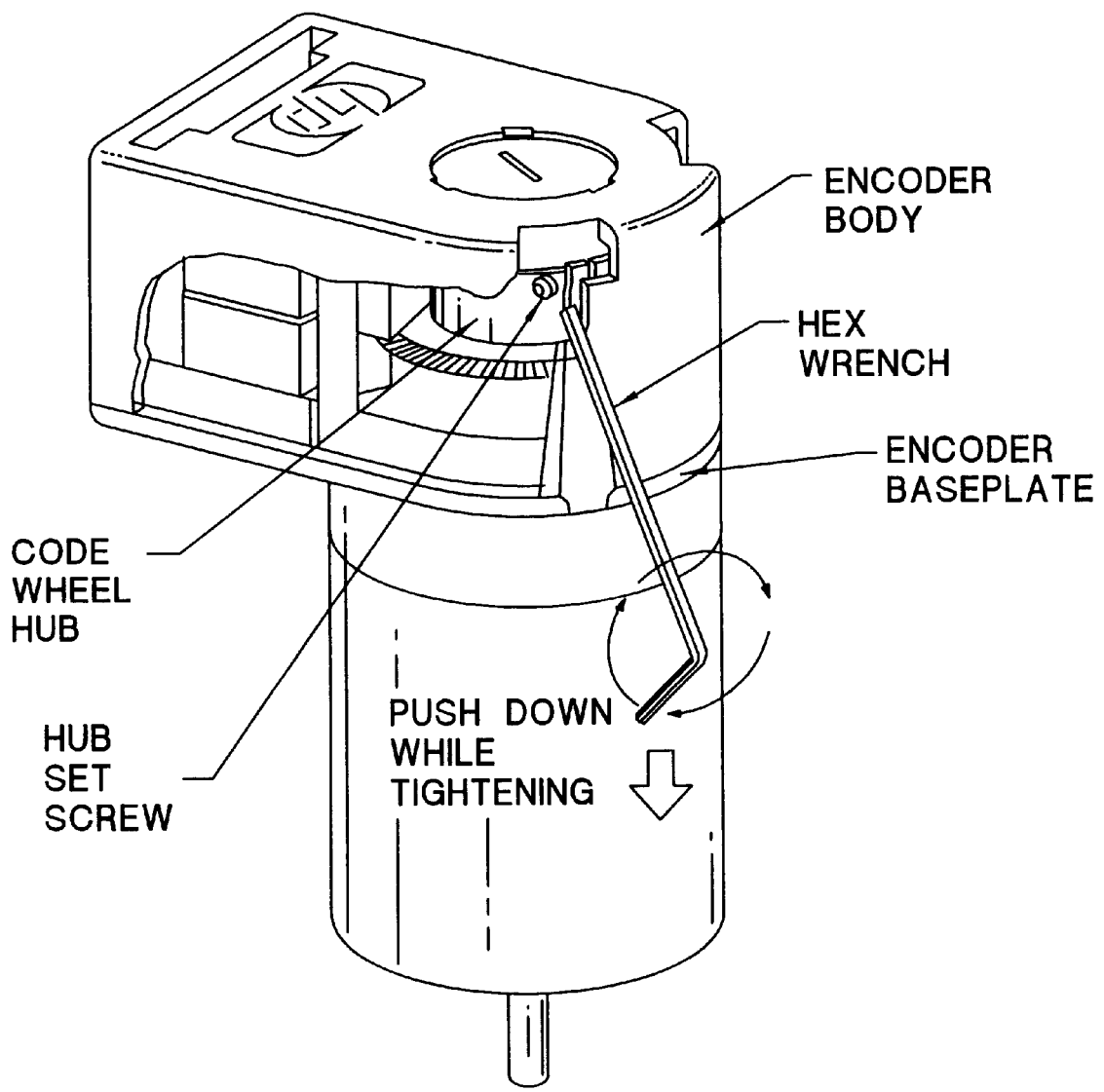
FIG. 1 illustrates a prior art method using cams.
Figure 2:
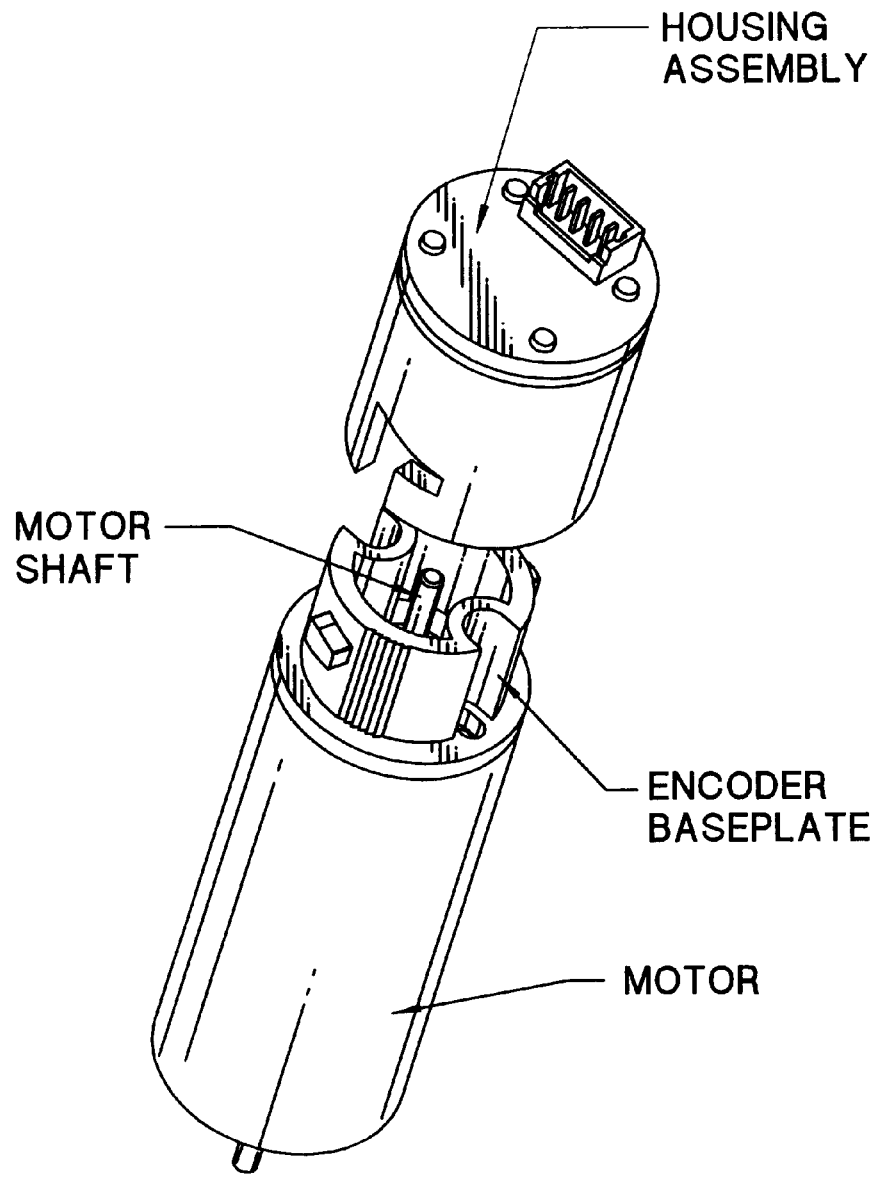
FIG. 2 illustrates another prior art method using cams.
Figure 3:
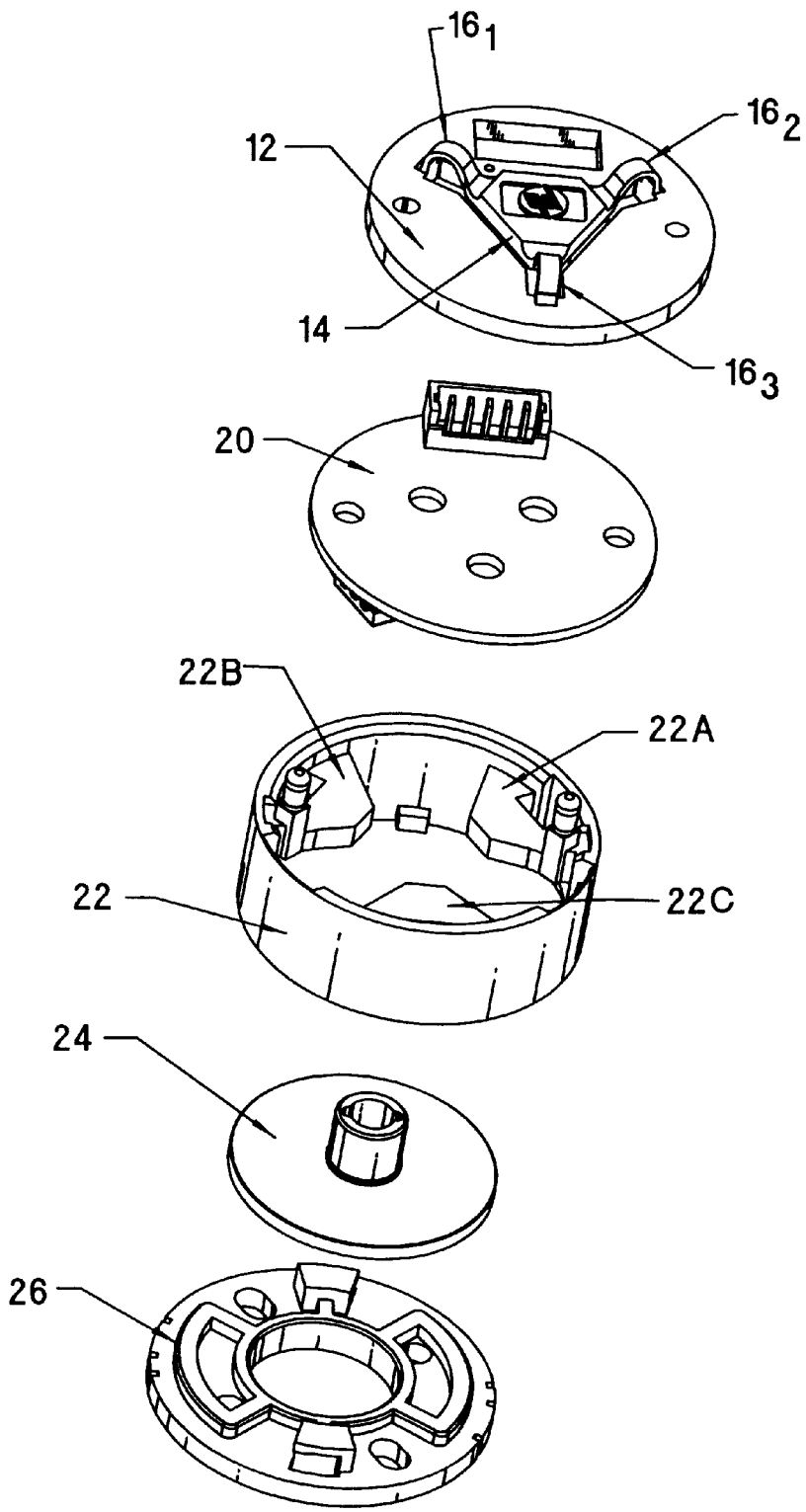
FIG. 3 illustrates an embodiment of the present invention.
Figure 4:
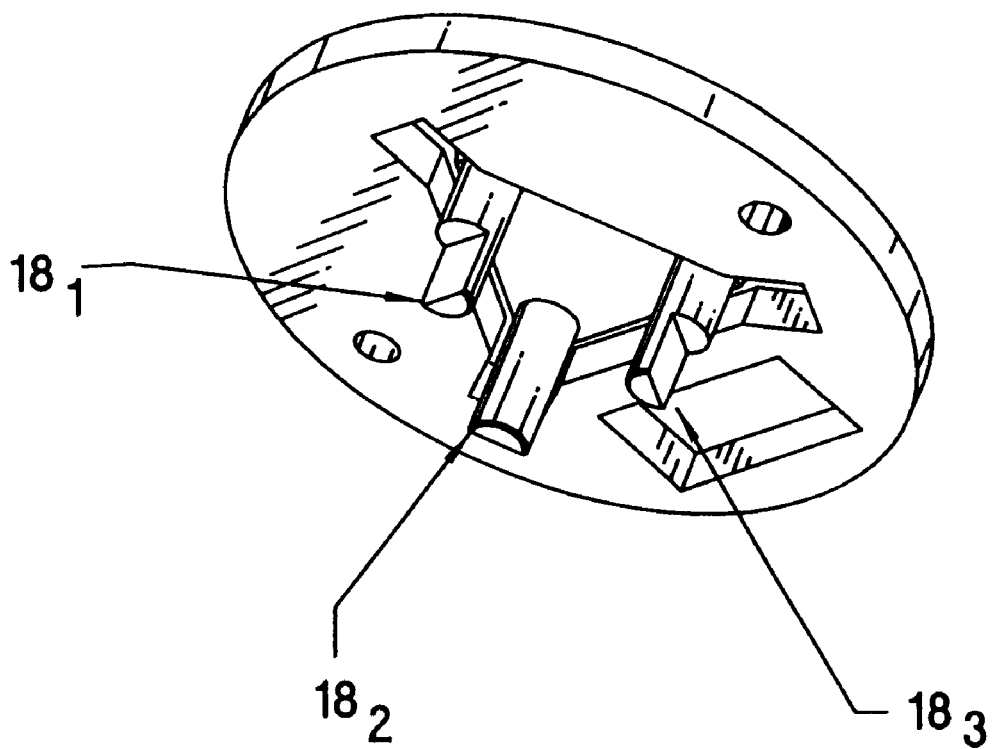
FIG. 4 illustrates a bottom view of the encoder cover shown in FIG. 3.

FIG. 3 is an exploded drawing illustrating an embodiment of the codewheel assembly of the present invention. FIG. 4 illustrates a bottom view of the encoder cover. The codewheel assembly 10 is mounted on the motor shaft of a motor (not shown). An encoder cover 12 includes a gap setting mechanism positioned centrally. The gap setting mechanism includes a centerpiece 14 having springs distributed along the perimeter that connect it to the encoder cover 12. The centerpiece 14 further includes at least one projection $18_1$, $18_2$, $18_3$. The projection 18 corresponds to the desired gapping distance. In a preferred embodiment, the centerpiece 14 is a triangle having a cantilever spring $16_1$, $16_2$, $16_3$ positioned at each vertex. The desired gapping distance corresponds to the length of three pins $18_1$, $18_2$, $18_3$. A PC board 20 that contains encoding modules interposes the encoder cover 12 and the encoder housing 22. The encoder housing 22 includes integrated mechanical stops 22A, 22B, 22C. The codewheel/hub 24 is positioned between the encoder housing 22 and the encoder baseplate 26.

During assembly, the triangular part 14 of the encoder cover 12 is pressed downward until it hits the integrated stops 22A, 22B, 22C in the housing 22. Three pins $18_1$, $18_2$, $18_3$ that extend from the bottom of the triangle 14 contact the codewheel/hub 24 and push it into the correct position on the shaft (not shown). If a set-screw hub is used, the codewheel is pressed upward against these three pins $18_1$, $18_2$, $18_3$ while the set screw is tightened. The triangular part 14 is then released, and the spring features it is molded together with raise the locating pins $18_1$, $18_2$, $18_3$ removing them from contact with the codewheel 24.

The cover 12 and the springs $16_1$, $16_2$, $16_3$ may be integrated into a plastic injection molding. Each spring has thickness greater than 0.5 mm for ease of manufacturing. Alternatively, discrete springs that are individually coupled to the cover 12 may be used. If discrete springs are used, any material may be used for the housing.

I claim:

1. A rotary shaft encoder assembly comprising:

an encoder baseplate, mounted on an endcap of a motor;

an encoder housing, having integrated mechanical stops, adjacent to the encoder baseplate;

a printed circuit board, that includes encoding modules, attached to the encoder housing;

a hub having a mounted codewheel, mounted on a shaft of the motor, interposing the encoder baseplate and encoder housing;

an encoder cover, positioned adjacent to the hub, having a side disposed towards the encoding module;

a centerpiece, having springs distributed along its perimeter, the springs being connected to the encoder cover; and at least one projection, positioned on the centerpiece on the side disposed towards the encoding module, abutting the mechanical stops, having a length that corresponds to a fixed distance between the encoder cover and mounted codewheel.

2. A rotary shaft encoder assembly, as defined in claim 1, wherein the centerpiece is a polygon having M sides, where M≟3.

3. A rotary shaft encoder assembly, as defined in claim 2, wherein the springs are cantilevers, each cantilever positioned at a vertex of the polygon.

4. A rotary shaft encoder assembly, as defined in claim 2, wherein the centerpiece is a circle and the springs are a circular spring.

5. A rotary shaft encoder assembly, as defined in claim 1, wherein the projection is a pin.

6. A rotary shaft encoder comprising:

a motor having an endcap and a shaft;

an encoder baseplate, mounted on the endcap;

an encoder housing, having integrated mechanical stops, adjacent the encoder baseplate;

a printed circuit board, that includes encoding modules, attached to the encoder housing;

a hub having a mounted codewheel, mounted on the shaft, interposing the encoder baseplate and encoder housing;

an encoder cover, positioned adjacent to the hub, having a side disposed towards the encoding modules;

a centerpiece, having springs distributed along its perimeter, the springs abutting the encoder cover; and at least one projection, positioned on the centerpiece on the side disposed towards the encoding modules, abutting the mechanical stops, having a length that corresponds to a fixed distance between the encoder cover and mounted codewheel.

7. A rotary shaft encoder, as defined in claim 6, wherein the centerpiece is a polygon having M sides, where M≧3.

8. A rotary shaft encoder, as defined in claim 7, wherein the springs are cantilevers, each cantilever positioned at a vertex of the polygon.

9. A rotary shaft encoder, as defined in claim 7, wherein the centerpiece is a circle and the springs are a circular spring.

10. A rotary shaft encoder, as defined in claim 6, wherein the projection is a pin.

* * * * *